(12) United States Patent
Tani et al.

(10) Patent No.: US 12,094,505 B2
(45) Date of Patent: Sep. 17, 2024

(54) MAGNETIC DISK DEVICE AND REFERENCE PATTERN WRITING METHOD OF THE SAME PRELIMINARY CLASS

(71) Applicants: Kabushiki Kaisha Toshiba, Tokyo (JP); Toshiba Electronic Devices & Storage Corporation, Tokyo (JP)

(72) Inventors: Hiroshi Tani, Kawasaki Kanagawa (JP); Kazuhiko Takaishi, Machida Tokyo (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 18/182,586

(22) Filed: Mar. 13, 2023

(65) Prior Publication Data

US 2024/0096360 A1    Mar. 21, 2024

(30) Foreign Application Priority Data

Sep. 15, 2022  (JP) ................................ 2022-147201

(51) Int. Cl.
   *G11B 20/18*     (2006.01)
   *G11B 5/55*      (2006.01)
   *G11B 5/596*     (2006.01)

(52) U.S. Cl.
   CPC .............................. *G11B 5/59688* (2013.01)

(58) Field of Classification Search
   CPC .. G11B 2020/10981; G11B 2020/1099; G11B 7/1263; G11B 7/1267; G11B 19/048; G11B 20/18; G11B 20/1816; G11B 20/182; G11B 27/36; G11B 5/5543
   USPC ....................... 360/75; 369/47.4, 47.53, 53.1
   See application file for complete search history.

(56) References Cited

U.S. PATENT DOCUMENTS

| | | | |
|---|---|---|---|
| 7,209,312 B1 | 4/2007 | Sutardja | |
| 7,995,305 B1 | 8/2011 | Ton-That et al. | |
| 8,004,787 B2 | 8/2011 | Cho et al. | |
| 8,395,856 B2 | 3/2013 | Kim et al. | |
| 2009/0040651 A1* | 2/2009 | Kudo | G11B 5/5547 360/77.01 |
| 2020/0082848 A1 | 3/2020 | Suzuki et al. | |

FOREIGN PATENT DOCUMENTS

| | | |
|---|---|---|
| JP | 2020-042875 A | 3/2020 |
| JP | 2020-042895 A | 3/2020 |

* cited by examiner

*Primary Examiner* — Nabil Z Hindi
(74) *Attorney, Agent, or Firm* — Kim & Stewart LLP

(57) ABSTRACT

According to one embodiment, a magnetic disk device writes a plurality of simulated reference patterns to the magnetic disk on write conditions different from each other, detects a write state of each of the write conditions according to detection results, and writes a plurality of regular reference patterns which become criteria for predetermined processing to be executed on the magnetic disk to the magnetic disk on the selected write condition.

9 Claims, 10 Drawing Sheets

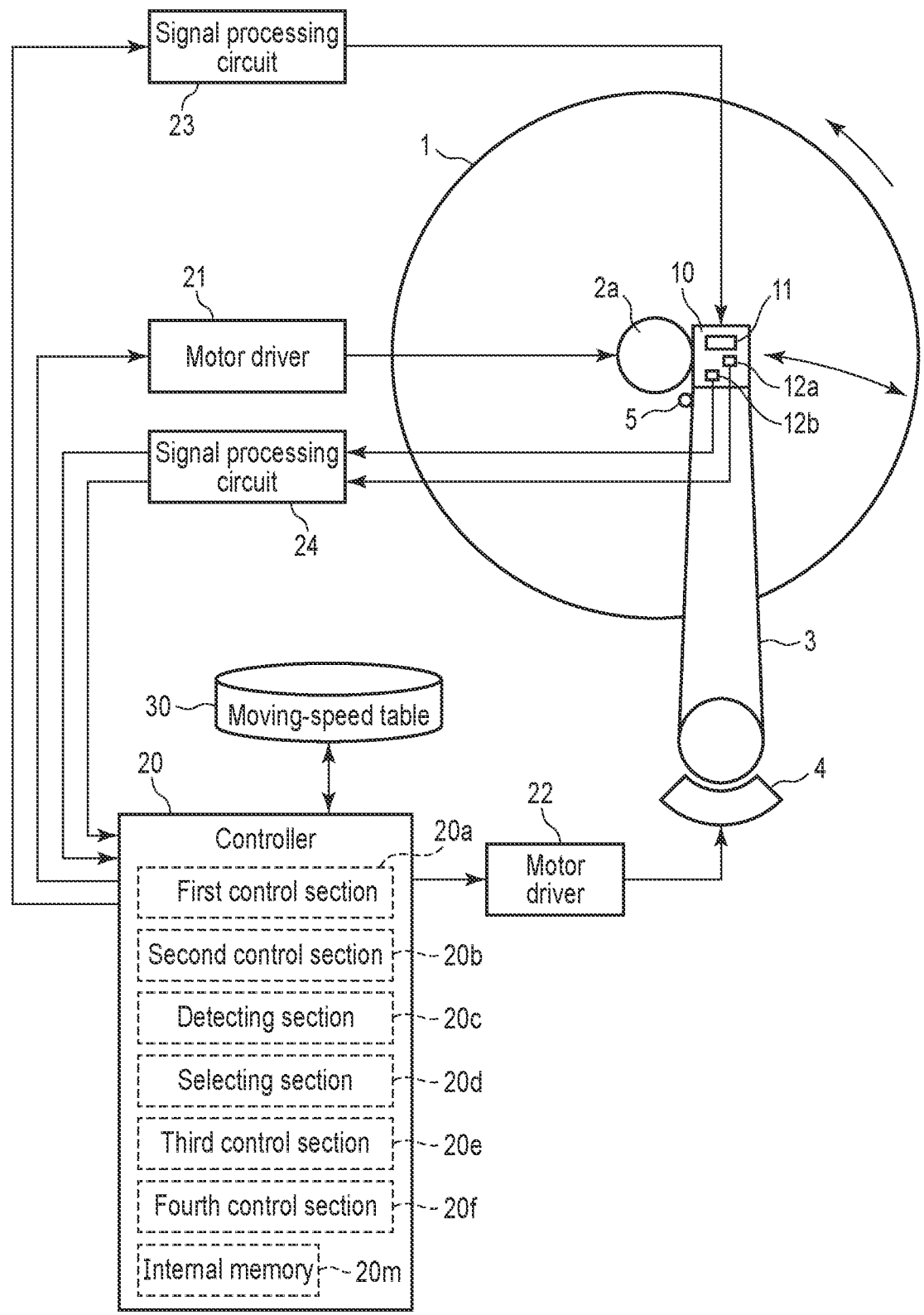
F I G. 1

| Write condition | Iw[mA] | OS[mA] | OSD[ps] |
|---|---|---|---|
| X1 | 20 | 10 | 240 |
| X2 | 20 | 10 | 460 |
| X3 | 40 | 30 | 240 |
| X4 | 40 | 30 | 460 |
| X5 | 20 | 30 | 240 |
| X6 | 20 | 30 | 460 |
| X7 | 40 | 10 | 240 |
| X8 | 40 | 10 | 460 |

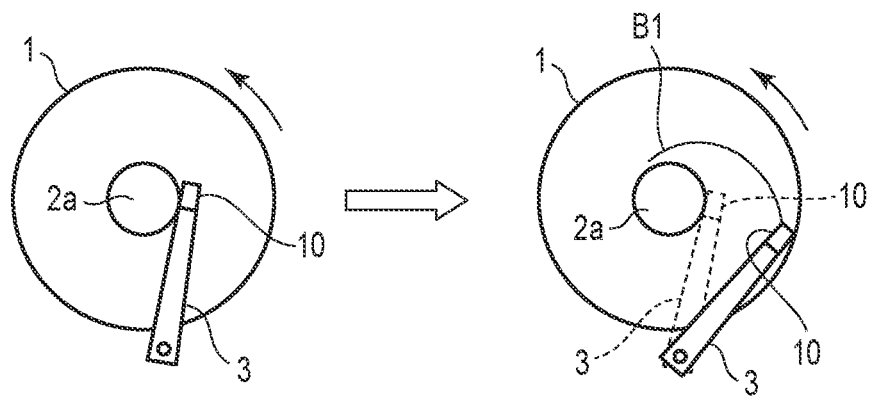
F I G. 11
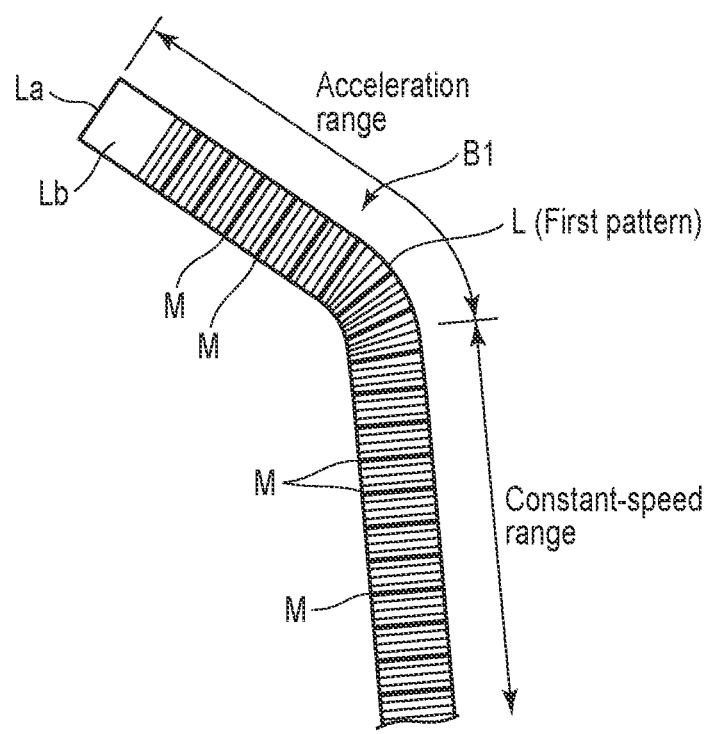
F I G. 12

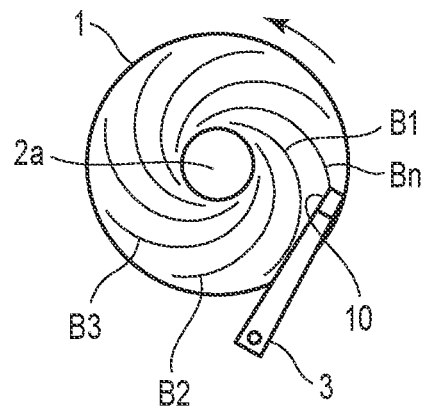
F I G. 13
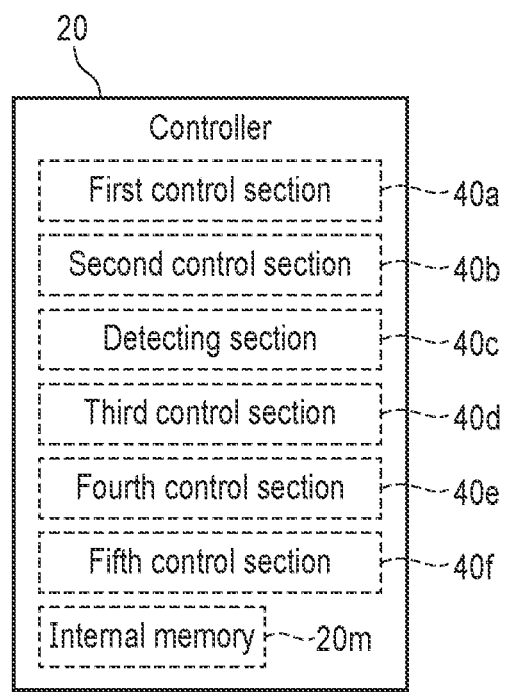
F I G. 14

MAGNETIC DISK DEVICE AND REFERENCE PATTERN WRITING METHOD OF THE SAME PRELIMINARY CLASS

CROSS-REFERENCE TO RELATED APPLICATIONS

This application is based upon and claims the benefit of priority from Japanese Patent Application No. 2022-147201, filed Sep. 15, 2022, the entire contents of which are incorporated herein by reference.

FIELD

Embodiments described herein relate generally to a magnetic disk device including a magnetic disk and magnetic head and reference pattern writing method of the magnetic disk device.

BACKGROUND

In a magnetic disk device including a magnetic disk and magnetic head configured to carry out write/read of data to/from the magnetic disk, processing of writing a plurality of curved reference patterns serving as criteria for processing of writing servo patterns to the magnetic disk, i.e., so-called Self Servo Write (SSW) to a blank magnetic disk on which no data is recorded is executed.

The plurality of reference patterns is written to the magnetic disk in such a manner as to extend from the inner circumference to the outer circumference in a spiral form (helically) while keeping predetermined spacing between the patterns by making the magnetic head seek (move) from the inner circumference of the magnetic disk to the outer circumference thereof in the radial direction in the state where the magnetic disk is rotated. These reference patterns are called spiral patterns and an aggregate of the spiral patterns is called a multi-spiral pattern or spiral sector group.

Depending on the quality of the state of write of the spiral patterns on the magnetic disk, there is sometimes a case where the subsequent servo pattern write processing cannot appropriately be executed.

BRIEF DESCRIPTION OF THE DRAWINGS

FIG. 1 is a view showing the configuration of each of first to third embodiments.

FIG. 11 is a view showing the state where the write element writes a first regular spiral pattern in each of the first to third embodiments.

FIG. 12 is a view showing the first regular spiral pattern written in each of the first to third embodiments.

FIG. 13 is a view showing the state where a plurality of regular spiral patterns is written in each of the first to third embodiments.

FIG. 14 is a view showing the configuration of a controller in a fourth embodiment.

DETAILED DESCRIPTION

In general, according to one embodiment, a magnetic disk device comprising: a magnetic head including a write element to be used to write data to a rotatable magnetic disk and a read element to be used to read data from the disk and movable in a radial direction of the magnetic disk; and a controller which controls rotation of the magnetic disk and movement of the magnetic head. The controller writes a plurality of simulated reference patterns to the magnetic disk on write conditions different from each other, detects a write state of each of the simulated reference patterns, selects one of the write conditions according to detection results, and writes a plurality of regular reference patterns which become criteria for predetermined processing to be executed on the magnetic disk to the magnetic disk on the selected write condition.

(1) First Embodiment

Figure 2:
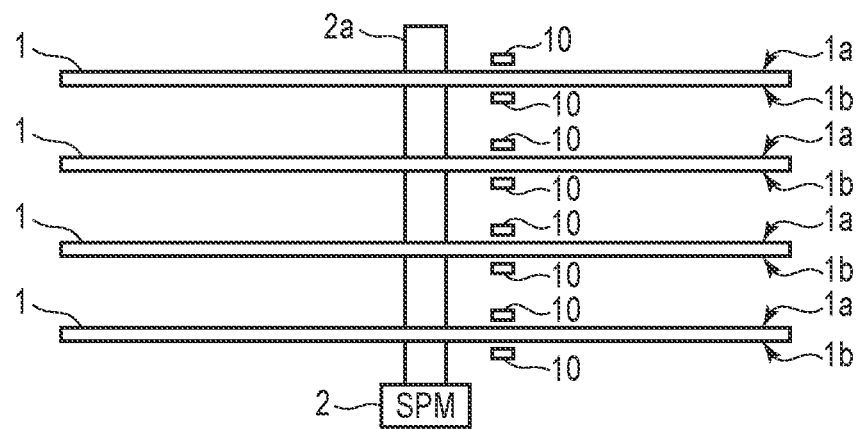
FIG. 2 is a view of a main part of FIG. 1 viewed from the lateral direction.

A magnetic disk device according to a first embodiment of the present invention is shown in FIG. 1 and a state where a part of FIG. 1 is viewed from the lateral direction is shown in FIG. 2.

A plurality of disk-like magnetic disks 1 is attached to a rotating shaft 2a of a spindle motor (SPM) 2 at their central parts at predetermined intervals and is rotated in the direction of an arrow shown in FIG. 1 by receiving the drive power of the spindle motor (SPM) 2. In the vicinities of these magnetic disks 1, arm-like actuators 3 are each arranged.

In each of the actuators 3, a base end portion thereof is swingably supported at a position separate from each of the magnetic disks 1 and tip end portion thereof extends to a position opposed to the upper surface side or lower surface side of each of the magnetic disks 1. At a position corresponding to the base end portion of each of the actuators 3, a voice coil motor (VCM) 4 is arranged and, by the drive power of each of the voice coil motors 4, the tip end portion of each of the actuators 3 is swung between the inner circumference and outer circumference of each of the magnetic disks 1 in the radial direction.

At a tip end portion of each of the actuators 3, a magnetic head 10 compatible with two-dimensional magnetic recording (TDMR) is arranged. Each of these magnetic heads 10 is movable in the radial direction of the magnetic disk 1 concomitantly with the swing of the actuator 3, includes a write element 11 configured to write magnetic data to the magnetic disk 1 opposed thereto, and two read elements 12a and 12b configured to read magnetic data from the magnetic disk 1 opposed to them, and seeks (moves) in the radial direction of each of the magnetic disks 1 concomitantly with the swing of each of the actuators 3. On the inner circumferential side of each of the magnetic disks 1, an inner stopper 5 configured to define the innermost position of each of the magnetic heads 10 is arranged.

The read element (first read element) 12a and read element (second read element) 12b are arranged in a state where the elements 12a and 12b are laid side by side in the swing direction (radial direction of the magnetic disk 1) of the actuator 3. The width dimension of each of the read elements 12a and 12b in the swing direction (radial direction of the magnetic disk 1) of the actuator 3 is less than the width dimension of one spiral pattern to be described later written by the write element 11. It is possible to oppose both the read elements 12a and 12b to one spiral pattern.

To a controller 20 serving as the nucleus of control of the magnetic disk device, a motor driver 21 configured to drive the spindle motor 2, motor driver 22 configured to drive the voice coil motor 4, signal processing circuit 23 configured to convert write data supplied from the controller 20 and written to the magnetic disk 1 into an analog signal and amplify the analog signal to thereby supply the amplified analog signal to the write element 11 of each of the magnetic heads 10, signal processing circuit 24 configured to amplify a read signal of each of the read elements 12a and 12b of each of the magnetic heads 10 and covert the amplified signal into a digital signal to thereby supply the digital signal to the controller 20, and moving-speed table 30 configured to determine the moving speed (seek speed) of the magnetic head 10 are connected.

Figure 3:
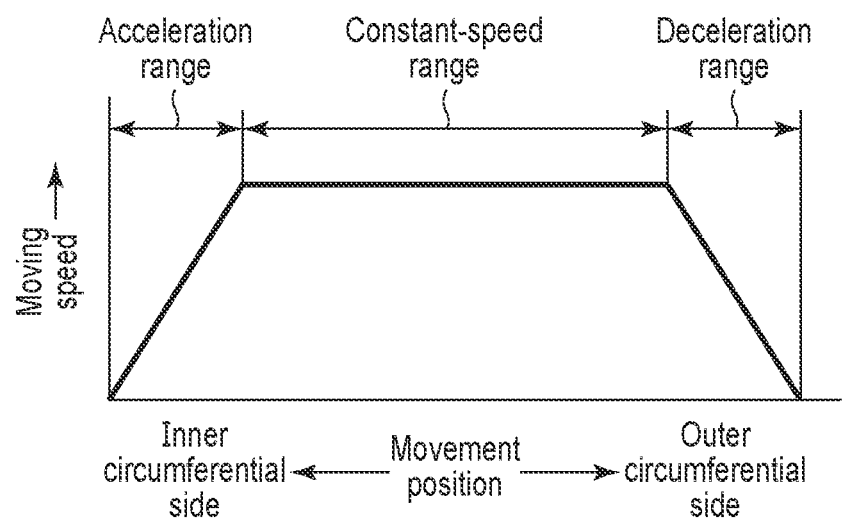
FIG. 3 is a view showing a moving-speed table of a magnetic head in each embodiment.

The moving-speed table 30, as shown in FIG. 3, stores therein specification speeds each configured to specify the moving speed (seek speed) of the magnetic head 10 in the radial direction of the magnetic disk 1 according to the movement position (seek position) of the magnetic head 10. The specification speed is constituted of an acceleration range in which at the time of a seek of the magnetic head 10 from the innermost circumference to the outermost circumference, the seek is accelerated from zero toward the constant-speed value, constant-speed range in which the constant-speed value is maintained, and deceleration range in which the seek is decelerated from the constant-speed value to zero.

The controller 20 is configured to control rotation of the magnetic disks 1 and movement of the magnetic heads 10, and writes a plurality of simulated reference patterns to the magnetic disk 1 on write conditions different from each other, detects the quality of the write state of each of the simulated reference patterns, selects one of the write conditions according to the detection results, and writes a plurality of regular reference patterns which become the criteria for the predetermined processing to be carried out on the magnetic disk 1 to the magnetic disk 1 on the aforementioned selected write condition.

As main functions of the reference pattern write processing, the controller 20 includes a first control section 20a, second control section 20b, detecting section 20c, selecting section 20d, third control section 20e, and fourth control section 20f.

The first control section 20a makes, in the state where the magnetic disk 1 is rotated at a constant rotational speed, the magnetic head 10 seek from the inner circumferential side of the magnetic disk 1 to the outer circumferential side thereof in the radial direction at a specification speed corresponding to the specification speed data in the moving-speed table 30, executes the seek of the magnetic head 10 a plurality of times in the circumferential direction of the magnetic disk 1, and writes, when the seeks are each within the acceleration range, curved simulated reference patterns to the magnetic disk 1 on write conditions X1 to Xn differing from seek to seek by means of the write element 11. The simulated reference patterns to be written individually for the seeks are called simulated reference patterns A1 to An.

The second control section 20b reads the simulated reference patterns A1 to An written to the magnetic disk 1 by tracing by tracing means of one of the read elements 12a and 12b, e.g., the read element 12a.

The detecting section 20c detects the write states of the simulated reference patterns A1 to An on the magnetic disk 1 from the read results of the second control section 20b. More specifically, the detecting section 20c detects the S/N ratios of the read signals of the read element 12a obtained by the second control section 20b as the write states of the simulated reference patterns A1 to An.

The selecting section 20d selects one of the aforementioned write conditions X1 to Xn according to the detection results of the detecting section 20c. More specifically, the selecting section 20d selects one of the write conditions X1 to Xn on which the most excellent S/N ratio among the S/N ratios detected by the detecting section 20c can be obtained.

The third control section 20e makes, in the state where the magnetic disk 1 is rotated at a constant speed, the magnetic head 10 seek from the inner circumferential side of the magnetic disk 1 to the outer circumferential side of thereof in the radial direction at a specification speed corresponding to the specification speed data in the moving-speed table 30, executes the seek of the magnetic head 10 a plurality of times in the circumferential direction of the magnetic disk 1, and writes, for each of these seeks, a curved regular reference pattern which becomes the criterion for the predetermined processing to be carried out on the magnetic disk 1 to the magnetic disk 1 on the write condition selected by the selecting section 20d by means of the write element 11. The regular reference patterns to be written individually for the seeks are called regular reference patterns B1 to Bn.

The predetermined processing implies, for example, processing of writing, to the magnetic disk 1, servo patterns to be used to detect the position of the magnetic head 10 relative to each of the tracks for data recording to be concentrically formed on the magnetic disk 1, i.e., so-called servo pattern write processing.

Each of the simulated reference patterns A1 to An and regular reference patterns B1 to Bn is a magnetic pattern in which the magnetic strength changes along the write direction with a fixed period T and includes sync marks M at positions located at predetermined intervals in the write direction.

The fourth control section 20f switches, when the detection of the detecting section 20c is not completed, the read element to be used to a read element 12b different from the read element 12a now in use.

Figure 4:
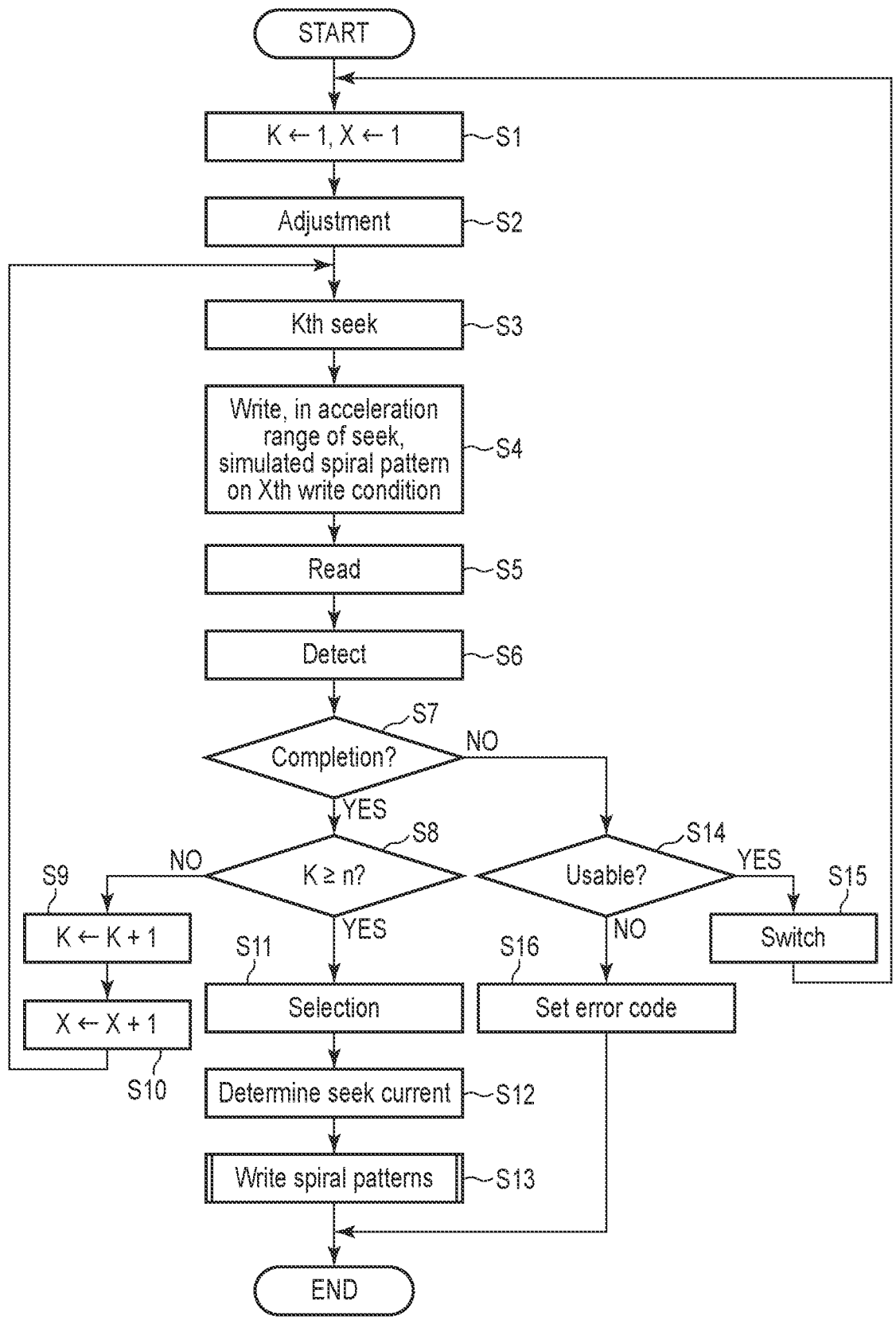
FIG. 4 is a flowchart showing control of each of the first to third embodiments.

Next, control to be executed by the controller 20 will be described with reference to the flowchart shown in FIG. 4.

When carrying out the reference pattern write processing on the magnetic disk 1, the controller 20 sets each of the number-of-seeks (patterns) data K and condition specifying data X to "1" as initial processing (S1) and adjusts the levitation position of the magnetic head 10 relative to the magnetic disk 1 (S2).

Figure 5:
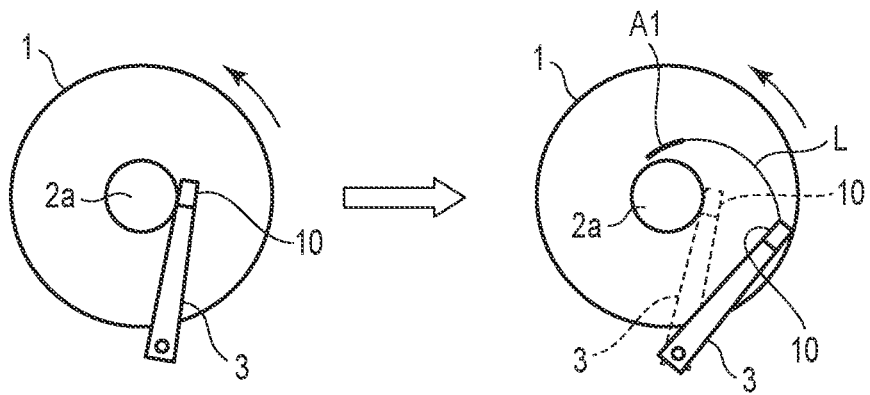
FIG. 5 is a view showing the state where a write element writes a first simulated spiral pattern in each of the first to third embodiments.

Then, in the state where the magnetic disk 1 is rotated at a fixed rotational speed as shown in FIG. 5, the controller 20 makes the magnetic head 10 seek from the innermost circumference abutting on the inner stopper 5 to the outermost circumference (S3). Of the acceleration range, constant-speed range, and deceleration range of the first seek, in the first acceleration range, the controller 20 writes the first simulated reference pattern A1 based on the number-of-seeks data K (=1) to the magnetic disk 1 on the write condition X1 based on the condition specifying data X (=1) by means of the write element 11 (S4). The simulated reference pattern A1 is hereinafter referred to as the simulated spiral pattern A1.

Figure 6:
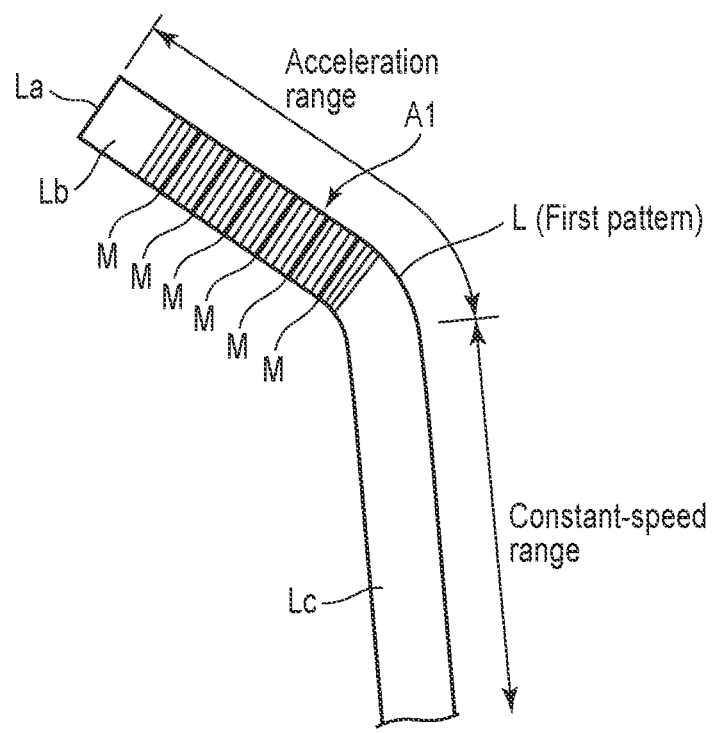
FIG. 6 is a view showing a path of a first seek and first simulated spiral pattern written to the path of the seek in each of the first to third embodiment.

The simulated spiral pattern A1 is, as shown in FIG. 6, a magnetic pattern in which the magnetic strength changes along the write direction with a fixed period T, includes sync marks at positions located at predetermined intervals in the write direction, and write thereof is started from a position separate from the leading edge La of the seek path L on the magnetic disk 1 by a non-write area Lb of predetermined spacing. The non-write area Lb corresponds to the size of the magnetic head 10 staying at the innermost circumference of the magnet disk 1 to abut on the inner stopper 5. In the area from the latter half of the acceleration range of the seek path L to the constant-speed range and deceleration range, a non-write area Lc is secured.

Figures 7, 8:
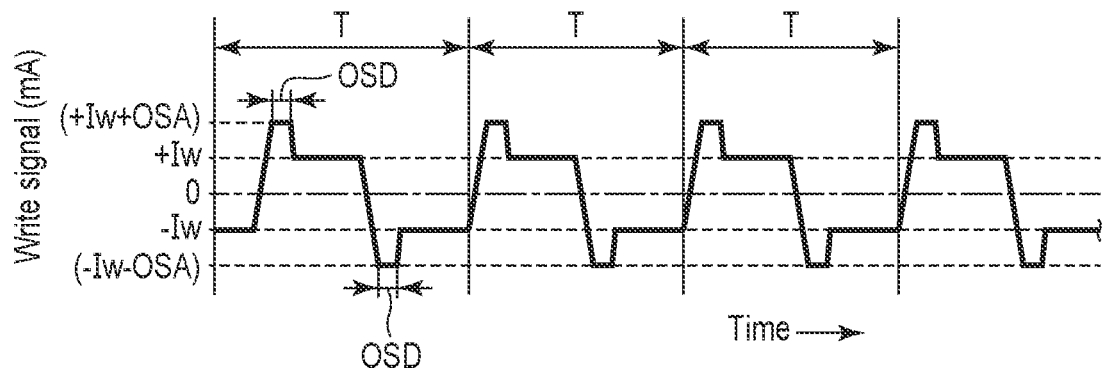
FIG. 7 is a view showing a waveform of a write signal in each of the first to third embodiments.
FIG. 8 is a view showing a plurality write conditions in each of the first to third embodiments.

The waveform of a write signal to be supplied to the read element 12a for writing of the simulated spiral pattern A1 changes, as shown in FIG. 7, in the fixed period T, from retention of the "−Iw" level, to overshoot from the "−Iw" level to the "+Iw+OSA" level, to retention of the "+Iw+OSA" level for a fixed time "OSD", to fall from the "+Iw+OSA" level to the "+IW" level, to retention of the "+IW" level, to overshoot from the "+IW" level to the "−Iw−OSA" level, to retention of the "−Iw−OSA" level for a fixed time, to rise from "−Iw−OSA" level to the "−Iw" level, and to retention of the "−Iw" level.

The controller 20 stores each of the parameters "Iw", "OSA", and "OSD" of the write signals having a plurality of write conditions X1, X2, • • • Xn different from each other as shown in FIG. 8 in the internal memory 20m. Depending on which of the write conditions X1, X2, • • • Xn is to be used, the write state of the simulated spiral pattern A1 changes.

Figure 9:
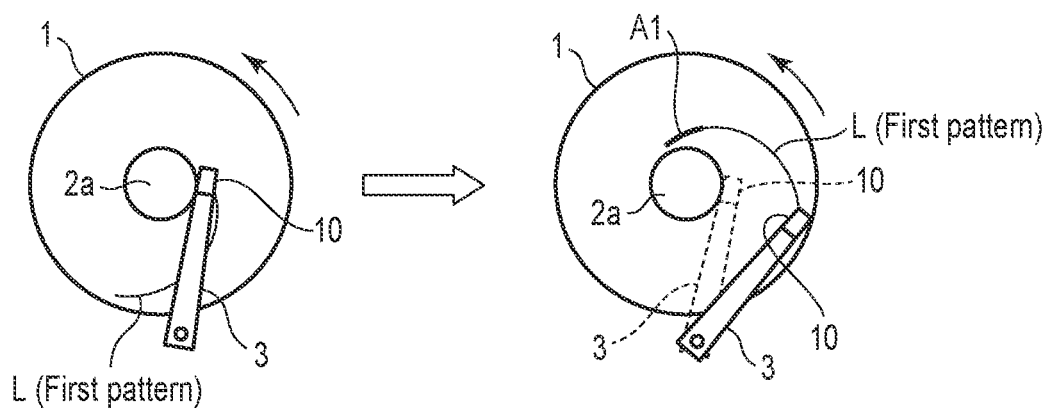
FIG. 9 is a view showing the state where a read element reads the first simulated spiral pattern in each of the first to third embodiments.

The controller 20 reads, as shown in FIG. 9, the simulated spiral pattern A1 written to the magnetic disk 1 by tracing by means of the read element 12a (S5). Then, the controller 20 detects, out of the read signals of the read element 12a, a ratio of a noise component N at the time when the read element 12a is dealing with the non-write area Lb of the seek path L to an effective component S at the time when the read element 12a is dealing with the simulated reference pattern A1, i.e., a so-called S/N ratio as the write state (quality of the simulated spiral pattern A1) of the simulated spiral pattern A1 (S6).

It should be noted that due to a deficiency of the written spiral pattern A1, fault in the read element 12a or the like, a possibility of the S/N ratio becoming undetectable is also conceivable.

Upon completion of detection of the S/N ratio as to the simulated reference pattern A1 (YES of S7), the controller 20 determines whether or not the number-of-seeks data K (=1) is greater than or equal to n (S8). At this point in time, the number-of-seeks data K is less then n (NO of S8), and hence the controller increments the number-of-seeks data K by "1" (S9), increments the condition specifying data X by "1" (S10), and returns to the processing of aforementioned S3 to thereby carry out a second seek based on the number-of-seeks data K (=2) (S3).

In the acceleration range of the second seek, the controller 20 writes the second simulated reference pattern A2 based on the number-of-seeks data K (=2) to the magnetic disk 1 on the write condition X2 based on the condition specifying data X (=2) by means of the write element 11 (S4). The simulated reference pattern A2 is hereinafter referred to as the simulated spiral pattern A2.

Subsequently, the controller 20 reads the simulated spiral pattern A2 written to the magnetic disk 1 by tracing by means of the read element 12a (S5). Then, the controller 20 detects the S/N ratio of the read signal of the read element 12a as the write state (quality of the simulated spiral pattern A2) of the simulated spiral pattern A2 (S6).

Upon completion of detection of the S/N ratio as to the simulated reference pattern A2 (YES of S7), the controller 20 determines whether or not the number-of-seeks data K (=2) is greater than or equal to n (S8). At this point in time, the number-of-seeks data K is less than n (NO of S8), and hence the controller increments the number-of-seeks data K by "1" (S9), increments the condition specifying data X by "1" (S10), and returns to the processing of aforementioned S3 to thereby carry out a third seek based on the number-of-seeks data K (=3) (S3).

Figure 10:
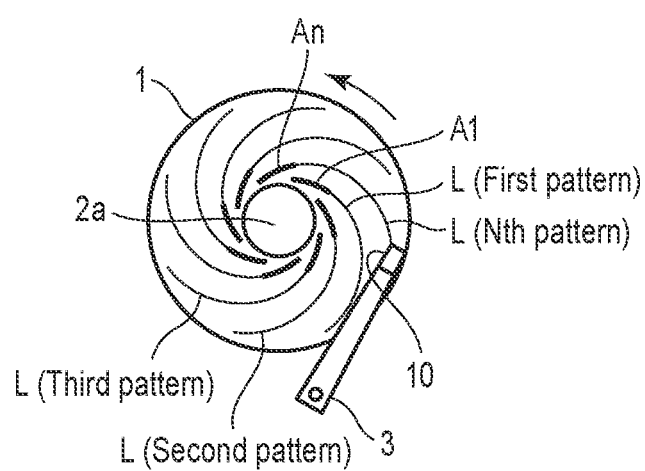
FIG. 10 is a view showing the state where a plurality of simulated spiral patterns is written in each of the first to third embodiments.

Hereafter, the processing identical to the above is repeated, whereby, as shown in FIG. 10, n simulated spiral patterns A1 to An are written in sequence to the magnetic disk 1 respectively on the write conditions X1 to Xn different from each other and in the state where the patterns A1 to An are separate from each other with a predetermined interval held between them.

Regarding the condition specifying data X, each of the amounts "1" to "n" is endlessly and repetitively set thereto. Concomitantly with this, the write conditions X1 to Xn are endlessly and repetitively read from the internal memory 20m and write of the simulated spiral patterns A1 to An corresponding to the write conditions read from the memory 20m is successively executed.

When the number-of-seeks data K reaches n (YES of S8), the controller 20 selects one of the write conditions X1 to Xn on which the most excellent S/N ratio among the S/N ratios detected until now can be obtained (S11). Further, the controller 20 successively grasps drive currents required for seeks of the magnetic head 10 until now, i.e., so-called seek currents, and determines, from among these seek currents, the seek current at the time when the most excellent seek has been carried out as the standard seek current to be used at the time of subsequent write of the regular reference patterns B1 to Bn (S12).

Subsequently, the controller 20 makes, as shown in FIG. 11, in the state where the magnetic disk 1 is rotated at a constant rotational speed, the magnetic head 10 seek from the inner circumference abutting on the inner stopper 5 to the outer circumference in the radial direction and, concomitantly with the seek, writes the regular reference pattern B1 which becomes the criterion for servo pattern write processing to the magnetic disk 1 on the write condition selected in aforementioned S11 by means of the write element 11 (S13). The regular reference pattern B1 is hereinafter referred to as the spiral pattern B1.

The spiral pattern B1 is, as shown in FIG. 12, a magnetic pattern in which magnetic strength changes along the write direction with a fixed period T, includes sync marks M at positions located at predetermined intervals in the write direction, write thereof is started from a position separate from the leading edge La of the seek path L on the magnetic disk 1 by a non-write area Lb of predetermined spacing, and the spiral pattern B1 is written throughout the overall area including the acceleration range, constant-speed range, and deceleration range. The non-write area Lb corresponds to the size of the magnetic head 10 staying at the innermost circumference of the magnetic disk 1 to abut on the inner stopper 5.

Thereafter, the controller 20 repeats the processing from aforementioned S13, whereby the controller 20 writes, as shown in FIG. 13, the spiral patterns B1 to Bn to the magnetic disk 1 in sequence on the write condition selected in aforementioned S11 and in the state where the patterns B1 to Bn are separate from each other with a predetermined interval held between them by means of the write element 11 (S13). Although the number of the spiral patterns B1 to Bn is made equal to the number of patterns of the simulated spiral patterns A1 to An on the drawing, actually the number of the spiral patterns B1 to Bn is greater than the number of patterns of the simulated spiral patterns A1 to An.

Incidentally, at the time of read of the simulated spiral patterns A1 to An, when the detection of the S/N ratio in aforementioned S6 is not completed (NO of S7), the controller 20 determines whether or not another read element 12b different from the read element 12a now in use is in a usable state (S14).

Regarding the read of the simulated spiral patterns A1 to An, when there is no usage history of the read element 12b or when although there is a usage history of the read element 12b, if there is no abnormal history such as incompletion or the like of detection of the S/N ratio with respect to the read element 12b, the read element 12b is usable.

When the read element 12b is usable (YES of S14), the controller 20 switches the read element to be used to the read element 12b different from the read element 12a now in use (S15) and executes the processing from first S1 again.

When the read element 12b is unusable (NO of S14), the controller 20 sets, on the basis of a determination that it is impossible to further continue the write processing, an error code in the internal memory 20m (S16) and terminates the series of processing.

As described above, the simulated spiral patterns A1 to An are written to the magnetic disk 1 on the write conditions X1 to Xn different from each other, write states of the simulated spiral patterns A1 to An are detected, one of the write conditions X1 to Xn is selected according to the detection results, and spiral patterns B1 to Bn to be used for the servo pattern write processing are successively written to the magnetic disk 1 on the aforementioned selected write condition, whereby it is possible to write the spiral pattern B1 to Bn to the magnetic disk 1 with the highest possible quality. By extension, it becomes possible to execute high-accuracy servo pattern write processing.

Whereas the write positions of the spiral patterns B1 to Bn are in all the acceleration range, constant-speed range, and deceleration range of the seek of the magnetic head 10, write positions of the simulated spiral patterns A1 to An are in only the acceleration range of the seek of the magnetic head 10, and hence even when the simulated spiral patterns A1 to An remain on the magnetic disk 1, this never adversely affects the functions of the spiral patterns B1 to Bn to be used for the servo pattern write processing.

Although in the embodiment described above, out of the read signals of the read element 12a, the ratio of a noise component N at the time when the read element 12a is dealing with the non-write area Lb of the seek path L on the leading edge La side to an effective component S at the time when the read element 12a is dealing with the simulated reference pattern A1, i.e., the S/N ratio is detected as the "quality of the write state", the ratio of a noise component N at the time when the read element 12a is dealing with the non-write area Lc of the seek path L on the constant-speed range side to an effective component S at the time when the read element 12a is dealing with the simulated reference pattern A1, i.e., the S/N ratio may also be detected as the "quality of the write state".

(2) Second Embodiment

Although in the first embodiment, the S/N ratio of the read signal of the read element 12a is detected as the write state of each of the simulated spiral patterns A1 to An, in a second embodiment of the present invention, a controller 20 detects the number of sync marks M included in the read signal of a read element 12a as the write state (quality of each of the simulated spiral patterns A1 to An) of each of the simulated spiral patterns A1 to An (S6). Then, the controller 20 selects, from among the write conditions X1 to Xn, a write condition on which the number of detected sync marks M becomes the largest as the condition for writing of the spiral patterns B1 to Bn (S11).

It should be noted that due to a deficiency of the written simulated spiral patterns A1 to An, fault in the read element 12a or the like, a possibility of the sync marks M becoming undetectable is also conceivable.

When detection of the sync marks M is not completed (NO of S7), the controller 20 determines whether or not another read element 12b different from the read element 12a now in use is in a usable state (S14).

When the read element 12b is usable (YES of S14), the controller 20 switches the read element to be used to the read element 12b different from the read element 12a now in use (S15) and executes the processing from first S1 again.

When the read element 12b is unusable (NO of S14), the controller 20 sets, on the basis of a determination that it is impossible to further continue the write processing, an error code in the internal memory 20m (S16) and terminates the series of processing.

Other configurations and effect are identical to the first embodiment.

(3) Third Embodiment

In a third embodiment of the present invention, a fourth control section 20f of a controller differs from the first embodiment as described below.

When detection of a detecting section 20c is not completed, the fourth control section 20f switches the magnetic disk 1 and magnetic head 10 to be used to a magnetic disk 1 and magnetic head 10 different from the magnetic disk 1 and magnetic head 10 now in use.

That is, when detection of the S/N ratio or detection of the number of sync marks M is not completed (NO of S7), the controller 20 determines whether or not a magnetic disk 1 and magnetic head 10 different from the magnetic disk 1 and magnetic head 10 which are now in use are each in a usable state (S14).

When there is no usage history of each of aforementioned another magnetic disk 1 and another magnetic head 10 with respect to write and read of the simulated spiral patterns A1 to An or when although there is a usage history of each of another magnetic disk 1 and another magnetic head 10, if there is no abnormal history such as incompletion of detection of the S/N ratio, detection of the number of sync marks M, and the like, the aforementioned magnetic disk 1 and magnetic head 10 different from the in-use magnetic disk 1 and magnetic head 10 are usable.

Another magnetic disk 1 and magnetic head 10 include an obverse surface 1a of a magnetic disk 1 and magnetic head 10 opposed to the obverse surface 1a, and reverse surface 1b of the magnetic disk 1 and magnetic head 10 opposed to the reverse surface 1b.

When the magnetic disk 1 and magnetic head 10 different from the in-use magnetic disk 1 and magnetic head 10 are usable (YES of S14), the controller 20 switches the magnetic disk 1 and magnetic head 10 to be used to the magnetic disk 1 and magnetic head 10 different from those now in use (S15), and executes the processing from first S1 again.

When the magnetic disk 1 and magnetic head 10 different from the in-use magnetic disk 1 and magnetic head 10 are unusable (NO of S14), the controller 20 sets, on the basis of a determination that it is impossible to further continue the write processing, an error code in the internal memory 20m (S16) and terminates the series of processing.

Other configurations and effect are identical to the first embodiment.

(4) Fourth Embodiment

A fourth embodiment of the present invention will be described below.

A controller 20 writes a first reference pattern which becomes a criterion for predetermined processing (for example, servo pattern write processing) to be carried out on the magnetic disk 1 to the magnetic disk 1, detects a write state of the first reference pattern, writes, when the detection result is greater than or equal to a threshold, a second reference pattern which becomes the criterion for the aforementioned predetermined processing to the magnetic disk 1 and, when the detection result is less than the aforementioned threshold, deletes the already written first reference pattern and writes the same first reference pattern to the magnetic disk 1 again.

As main functions of the reference pattern write processing, the controller 20 includes, as shown in FIG. 14, a first control section 40a, second control section 40b, detecting section 40c, third control section 40d, fourth control section 40e, and fifth control section 40f.

The first control section 40a makes, in the state where the magnetic disk 1 is rotated at a constant rotational speed, the magnetic head 10 seek from the inner circumferential side of the magnetic disk 1 to the outer circumferential side thereof in the radial direction at a specification speed corresponding to the specification speed data in the moving-speed table 30 and, concomitantly with the seek, writes a curved first reference pattern B1 which becomes the criterion for the predetermined processing (servo pattern write processing) to be carried out on the magnetic disk 1 to the magnetic disk 1 by means of a write element 11.

The second control section 40b reads the first reference pattern B1 written to the magnetic disk 1 by tracing by means of one of the read elements 12a and 12b, for example, the read element 12a.

The detecting section 40c detects the write state of the first reference pattern B1 on the magnetic disk 1 from a read result of the second control section 40b. More specifically, the detecting section 40c detects, out of the read signals of the read element 12a obtained by the second control section 40b, the S/N ratio of the read signal at the time when the seek of the magnetic head 10 is within the constant-speed range as the write state (quality of the first reference pattern B1) of the first reference pattern B1.

The third control section 40d makes, when the detection result of the detecting section 40c is greater than or equal to a threshold, in the state where the magnetic disk 1 is rotated at a constant rotational speed, the magnetic head 10 seek from the inner circumferential side of the magnetic disk 1 to the outer circumferential side thereof in the radial direction at a specification speed corresponding to the specification speed data in the moving-speed table 30 and, concomitantly with the seek, writes a second reference pattern B2 which becomes the criterion for the predetermined processing to the magnetic disk 1 by means of a write element 11.

The fourth control section 40e deletes, when the detection result of the detecting section 40c is less than the threshold, the first reference pattern B1 written to the magnetic disk 1 by means of the write element 11 and writes the same first reference pattern B1 to the magnetic disk 1 again.

The fifth control section 40f switches, when the detection of the detecting section 40c is not completed, the read element to be used to a read element 12b different from the read element 12a now in use.

The reference patterns B1 and B2 respectively correspond to the regular reference patterns B1 and B2 of the first embodiment, are each magnetic patterns in which magnetic strength changes along the write direction with a fixed period T, and each include sync marks at positions located at predetermined intervals in the write direction.

Figure 15:
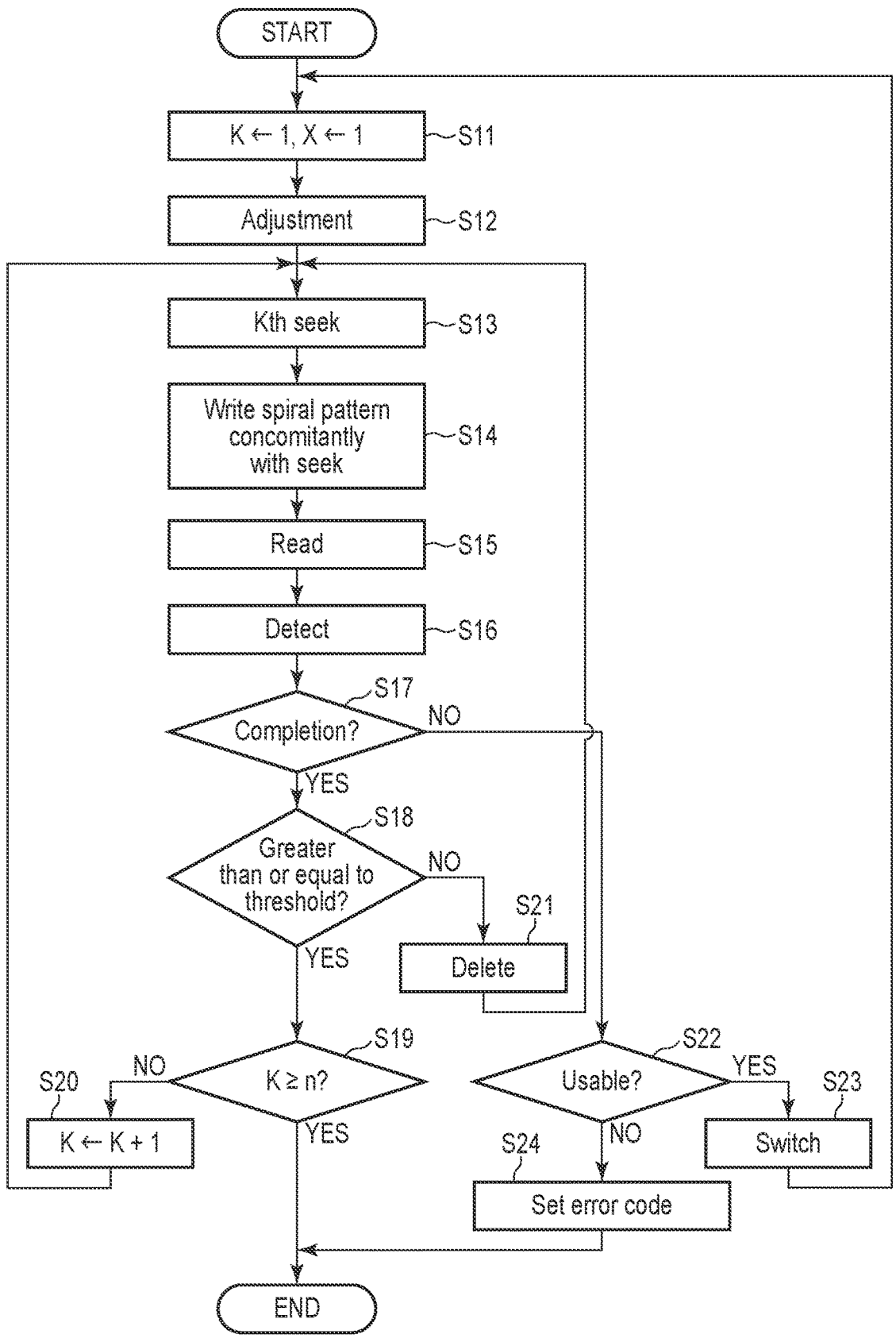
FIG. 15 is a flowchart showing control of the fourth embodiment.

Control to be executed by the controller 20 will be described below with reference to a flowchart of FIG. 15.

When carrying out the reference pattern write processing on the magnetic disk 1, the controller 20 sets, as initial processing, each of the number-of-seeks data K and condition specifying data X to "1" (S11) and adjusts the levitation position of the magnetic head 10 relative to the magnetic disk 1 (S12).

Then, in the state where the magnetic disk 1 is rotated at a fixed rotational speed, the controller makes the magnetic head 10 seek from the innermost circumference abutting on the inner stopper 5 to the outermost circumference in the radial direction (S13).

Concomitantly with this first seek, the controller 20 writes the first reference pattern B1 based on the number-of-seeks data K (=1) to the magnetic disk 1 by means of the write element 11 (S14). The reference pattern B1 is hereinafter referred to as the spiral pattern B1.

The spiral pattern B1 is a pattern which becomes the criterion for the servo pattern write processing, is a magnetic pattern in which magnetic strength changes along the write direction with a fixed period T as shown in FIG. 12 of the first embodiment, includes sync marks M at positions located at predetermined intervals in the write direction, and write thereof is started from a position separate from the leading edge La of the seek path L on the magnetic disk 1 by a non-write area Lb of predetermined spacing. The non-write area Lb corresponds to the size of the magnetic head 10 staying at the innermost circumference of the magnetic disk 1 to abut on the inner stopper 5.

Subsequently, the controller 20 reads the spiral pattern B1 written to the magnetic disk 1 by tracing by means of the read element 12a (S15). Then, the controller 20 detects, out of the read signals of the read element 12a, a ratio of a noise component N at the time when the read element 12a is dealing with the non-write area Lb of the seek path L to an effective component S at the time when the read element 12a is dealing with the spiral pattern B1 in the constant-speed range, i.e., a so-called S/N ratio as the write state (quality of the spiral pattern B1) of the spiral pattern B1 (S16).

It should be noted that due to a deficiency of the written spiral pattern A1, fault in the read element 12a or the like, a possibility of the S/N ratio becoming undetectable is also conceivable.

Figure 16:
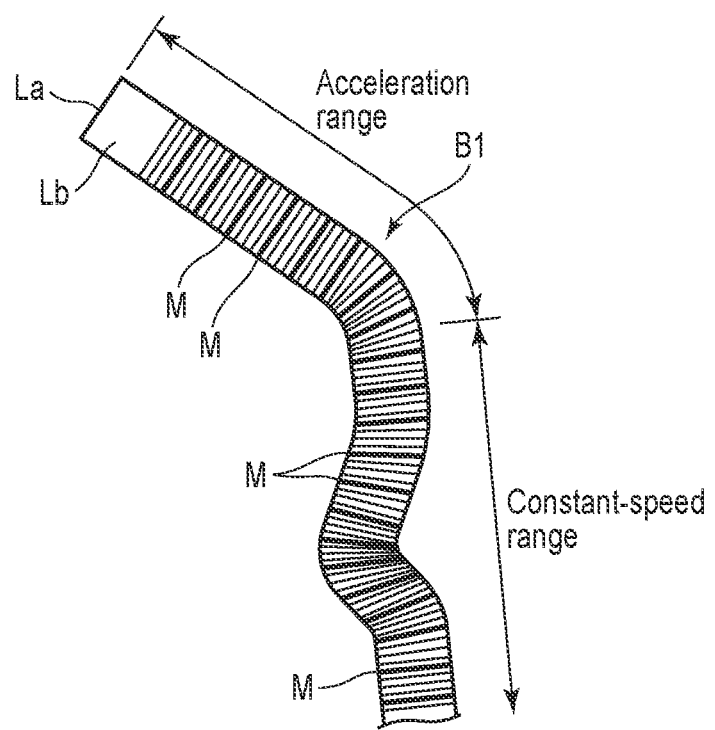
FIG. 16 is a view showing an example of a spiral pattern written in the fourth embodiment.

Further, for example, as shown in FIG. 16, in the spiral pattern B1 written to the magnetic disk 1, when a bend occurs at a portion corresponding to the constant-speed range of the seek, there is sometimes a case where although the S/N ratio itself can be detected, the value of the detected S/N ratio is excessively low.

Upon completion of the detection of the S/N ratio (YES of S17), the controller 20 determines, on condition that the detected S/N ratio is greater than or equal to the threshold (YES of S18), whether or not the number-of-seeks data K (=1) is greater than or equal to n (S19). At this point in time, the number-of-seeks data K is less than n (NO of S19), and hence the controller 20 increments the number-of-seeks data K by "1" (S20) and returns to the processing of aforementioned S13 to carry out a second seek based on the number-of-seeks data K (=2) (S13).

Concomitantly with this second seek, the controller 20 writes a second reference pattern B2 based on the number-of-seeks data K (=2) to the magnetic disk 1 by means of the write element 11 (S14). The reference pattern B2 is hereinafter referred to as the spiral pattern B2. The spiral pattern B2 becomes the criterion for the servo pattern write processing as in the case of the spiral pattern B1.

Subsequently, the controller 20 reads the spiral pattern B2 written to the magnetic disk 1 by tracing by means of the read element 12a (S15). Then, the controller 20 detects, out of the read signals of the read element 12a, a ratio of a noise component N at the time when the read element 12a is dealing with the non-write area Lb of the seek path L to an effective component S at the time when the read element 12a is dealing with the spiral pattern B1 in the constant-speed range of the seek, i.e., a so-called S/N ratio as the write state (quality of the spiral pattern B2) of the spiral pattern B2 (S16).

Upon completion of the detection of the S/N ratio (YES of S17), the controller 20 determines, on condition that the detected S/N ratio is greater than or equal to the threshold (YES of S18), whether or not the number-of-seeks data K (=2) is greater than or equal to n (S19). At this point in time, the number-of-seeks data K is less than n (NO of S19), and hence the controller 20 increments the number-of-seeks data K by "1" (S20) and returns to the processing of aforementioned S13 to carry out a third seek based on the number-of-seeks data K (=3) (S13).

Thereafter, the controller 20 repeats the same processing, whereby, as shown in FIG. 13, the controller 20 writes the many spiral patterns B1 to Bn to the magnetic disk 1 in sequence by means of the write element 11 in the state where the patterns B1 to Bn are arranged with a predetermined interval held between them (S14).

Incidentally, at the time of read of, for example, the spiral pattern B1 written to the magnetic disk 1, when although detection of the S/N ratio of the read signal is completed (YES of S17), if the detected S/N ratio falls short of the threshold (NO of S18), the controller 20 deletes, on the basis of a determination that the write state of the spiral pattern B1 is abnormal, the spiral pattern B1 on the magnetic disk 1 by means of the write element 11 (S21). Subsequently, the controller 20 returns to the processing of aforementioned S13, and carries out a seek for writing the spiral pattern B1 to the magnetic disk 1 again (S13). Concomitantly with this seek, the controller 20 writes the spiral pattern B1 to the magnetic disk 1 again by means of the write element 11 (S14).

Thereafter, the controller 20 repeats the processing from aforementioned S15, whereby, as shown in FIG. 13, the controller 20 writes the spiral patterns B1 to Bn in sequence to the magnetic disk 1 by means of the write element 11 in a state where a predetermined interval is held between them.

It should be noted that at the time of read of the spiral patterns B1 to Bn, when the detection of the S/N ratio in aforementioned S16 is not completed (NO of S17), the controller 20 determines whether or not a read element 12b different from the read element 12a now in use is in a usable state (S22).

Regarding the read of the spiral patterns B1 to Bn, when there is no usage history of the read element 12b or when although there is a usage history of the read element 12b, if there is no abnormal history such as incompletion or the like of detection of the S/N ratio with respect to the read element 12b, the read element 12b is usable.

When the read element 12b is usable (YES of S22), the controller 20 switches the read element to be used to the read element 12b different from the read element 12a now in use (S23) and executes the processing from first S11 again.

When the read element is unusable (NO of S22), the controller 20 sets, on the basis of a determination that it is impossible to further continue the write processing, an error code in the internal memory 20m (S24) and terminates the series of processing.

As described above, by repeating the processing of writing the spiral pattern B1 which becomes the criterion for the servo pattern write processing to be executed on the magnetic disk 1 to the magnetic disk 1, detecting the write state of the aforementioned spiral pattern B1, writing, when the detection result is greater than or equal to the threshold, the next spiral pattern B2 which becomes the criterion for the servo pattern write processing to the magnetic disk 1, deleting, when the detection result is less than the threshold, the spiral pattern B1 which is already written, and writing the same spiral pattern B1 to the magnetic disk 1 again, it is possible to write the spiral patterns B1 to Bn to the magnetic disk 1 with the highest possible quality. By extension, it becomes possible to execute high-accuracy servo pattern write processing.

Configurations other than the controller 20 are identical to the first embodiment.

(5) Fifth Embodiment

Although in the fourth embodiment, the S/N ratio of the read signal of the read element 12a is detected as the write state of each of the spiral patterns B1 to Bn, in a fifth embodiment of the present invention, a controller 20 detects the number of sync marks M included in the read signal of a read element 12a as the write state of each of the spiral patterns B1 to Bn (S16).

Due to a deficiency of the written spiral patterns B1 to Bn, fault in the read element 12a or the like, a possibility of the sync marks becoming undetectable is also conceivable.

When detection of the number of the sync marks M is not completed (NO of S17), the controller 20 determines whether or not a read element 12b different from the read element 12a now in use is in a usable state (S22).

When the read element 12b is usable (YES of S22), the controller 20 switches the read element to be used to the read element 12b different from the read element 12a now in use (S23) and executes the processing from first S11 again.

When the read element 12b is unusable (NO of S22), the controller 20 sets, on the basis of a determination that it is impossible to further continue the write processing, an error code in the internal memory 20m (S24) and terminates the series of processing.

Other configurations and effect are identical to the fourth embodiment.

(6) Sixth Embodiment

In a sixth embodiment of the present invention, a fifth control section 40f of a controller differs from the first embodiment as described below.

The fifth control section 40f switches, when detection of a detecting section 40c is not completed, the magnetic disk 1 and magnetic head 10 to be used to a magnetic disk 1 and magnetic head 10 different from the magnetic disk 10 and magnetic head 10 now in use.

That is, when detection of the S/N ratio or detection of the number of sync marks M is not completed (NO of S17), the controller 20 determines whether or not a magnetic disk 1 and magnetic head 10 different from the magnetic disk 1 and magnetic head 10 now in use are each in a usable state (S22).

Regarding the write and read of the spiral patterns B1 to Bn, when there is no usage history of each of the magnetic disk 1 and magnetic head 10 different from the magnetic disk 1 and magnetic head 10 now in use or when although there is a usage history of each of the magnetic disk 1 and magnetic head 10 different from the magnetic disk 1 and magnetic head 10 now in use, if there is no abnormal history such as incompletion or the like of detection of the S/N ratio or detection of the number of the sync marks M, the magnetic disk 1 and magnetic head 10 different from the magnetic disk 1 and magnetic head 10 now in use are usable.

The magnetic disk 1 and magnetic head 10 different from the magnetic disk 1 and magnetic head 10 now in use include an obverse surface 1a of a magnetic disk 1 and magnetic head 10 opposed to the obverse surface 1a, and a reverse surface 1b of the magnetic disk 1 and magnetic head 10 opposed to the reverse surface 1b.

When the magnetic disk 1 and magnetic head 10 different from the magnetic disk 1 and magnetic head 10 now in use are usable (YES of S23), the controller 20 switches the magnetic disk 1 and magnetic head 10 to be used to the magnetic disk 1 and magnetic head 10 different from the magnetic disk 1 and magnetic head 10 now in use (S23) and executes the processing from first S11 again.

When the magnetic disk 1 and magnetic head 10 different from the magnetic disk 1 and magnetic head 10 now in use are unusable (NO Of S22), the controller 20 sets, on the basis of a determination that it is impossible to further continue the write processing, an error code in the internal memory 20m (S24) and terminates the series of processing.

Other configurations and effect are identical to the fourth embodiment.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device comprising:
a magnetic head including a write element to be used to write data to a rotatable magnetic disk and a read element to be used to read data from the disk and movable in a radial direction of the magnetic disk; and
a controller which controls rotation of the magnetic disk and movement of the magnetic head, wherein the controller includes:
a first control section which makes the magnetic head seek in a radial direction of the magnetic disk, executes the seek of the magnetic head in a circumferential direction of the magnetic disk a plurality of times, and writes, when each of the seeks is within an acceleration range, a simulated reference pattern to the magnetic disk on one of write conditions differing from seek to seek by means of the write element;
a second control section which reads simulated reference patterns that correspond to the seeks and have been written to the magnetic disk by means of the read element;
a detecting section which detects a write state of each of the simulated reference patterns on the magnetic disk from each reading result of the second control section;
a selecting section which selects one of the write conditions according to detection results of the detecting section; and
a third control section which makes the magnetic head seek in the radial direction of the magnetic disk, executes the seek of the magnetic head in the circumferential direction of the magnetic disk a plurality of times, and writes, for each of the seeks, a regular reference pattern which becomes a criterion for predetermined processing to be executed on the magnetic disk to the magnetic disk on the write condition selected by the selecting section by means of the write element.

2. The device of claim 1, wherein
the detecting section detects an S/N ratio of a read signal of the read element obtained by the second control section as a write state of each of the simulated reference patterns, and
the selecting section selects, from among the write conditions, a write condition on which the most excellent S/N ratio among the S/N ratios detected by the detecting section can be obtained.

3. The device of claim 1, wherein
each of the simulated reference patterns and the regular reference patterns is a magnetic pattern in which magnetic strength changes along a write direction with a fixed period and includes sync marks at positions located at predetermined intervals in the write direction,
the detecting section detects the number of the sync marks included in the read signal of the read element obtained by the second control section as the write state of each of the simulated reference patterns, and
the selecting section selects, from among the write conditions, a write condition on which the number of the sync marks detected by the detecting section becomes the largest.

4. The device of claim 1, wherein
the read element is constituted of a plurality of read elements, and
the controller further includes
a fourth control section which switches, when detection of the detecting section is not completed, the read element to be used for the processing of the second control section to another read element.

5. The device of claim 1, wherein
the magnetic disk is constituted of a plurality of magnetic disks,
the magnetic head is constituted of a plurality of magnetic heads, and
the controller further includes
a fourth control section which switches, when the detection of the detecting section is not completed, the magnetic disk and the magnetic head to be used to a magnetic disk and a magnetic head that are different from the magnetic disk and the magnetic head that are now in use.

6. A reference pattern writing method of a magnetic disk device including
a magnetic head including a write element to be used to write data to a rotatable magnetic disk and a read element to be used to read data from the disk and movable in a radial direction of the magnetic disk, and
a controller which controls rotation of the magnetic disk and movement of the magnetic head, the method comprising:
executing a seek of the magnetic head in a circumferential direction of the magnetic disk a plurality of times, and writing, when each of the seeks is within an acceleration range, a simulated reference pattern to the magnetic disk on one of write conditions differing from seek to seek by means of the write element;
reading simulated reference patterns that correspond to the seeks and have been written to the magnetic disk by means of the read element;
detecting a write state of each of the simulated reference patterns on the magnetic disk from each reading result;
selecting one of the write conditions according to detection results; and
making the magnetic head seek in the radial direction of the magnetic disk, executing the seek of the magnetic head in the circumferential direction of the magnetic disk a plurality of times, and writing, for each of the seeks, the regular reference pattern which becomes a criterion for a predetermined processing to be executed on the magnetic disk to the magnetic disk on the write condition by means of the write element.

7. A magnetic disk device comprising:
a magnetic head including a write element to be used to write data to a rotatable magnetic disk and a read element to be used to read data from the disk and movable in a radial direction of the magnetic disk; and
a controller which controls rotation of the magnetic disk and movement of the magnetic head, wherein the controller includes:
a first control section which makes the magnetic head seek in a radial direction of the magnetic disk and writes, concomitantly with the seek, a first reference pattern which becomes a criterion for predetermined processing to be executed on the magnetic disk to the magnetic disk by means of the write element;
a second control section which reads the first reference pattern written to the magnetic disk by means of the read element;
a detecting section which detects a write state of the first reference pattern on the magnetic disk from a read result of the second control section;
a third control section which makes, when a detection result of the detecting section is greater than or equal to a threshold, the magnetic head seek in the radial direction of the magnetic disk and writes, concomitantly with the seek, a second reference pattern which becomes the criterion for the predetermined processing to the magnetic disk by means of the write element; and
a fourth control section which deletes, when the detection result of the detecting section is less than the threshold, the first reference pattern written to the magnetic disk by means of the write element and writes the same first reference pattern to the magnetic disk again.

8. The device of claim 7, wherein
the read element is constituted of a plurality of read elements, and
the controller further includes:
a fifth control section which switches, when the detection of the detecting section is not completed, the read element to be used to a read element different from the read element now in use.

9. The device of claim 7, wherein
the magnetic disk is constituted of a plurality of magnetic disks,
the magnetic head is constituted of a plurality of magnetic heads, and
the controller further includes:
a fifth control section which switches, when the detection of the detecting section is not completed, the magnetic disk and the magnetic head to be used to a magnetic disk and a magnetic head that are different from the magnetic disk and the magnetic head that are now in use.

* * * * *